March 19, 1940.  E. R. KOHL  2,193,968
SPECTACLE LOUPE
Filed June 20, 1938
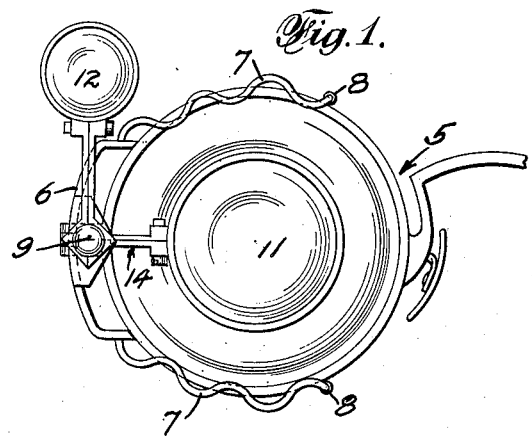
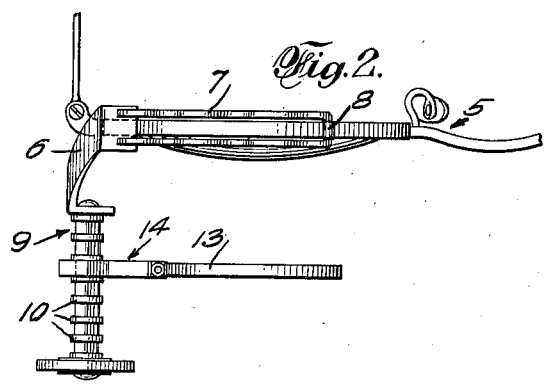
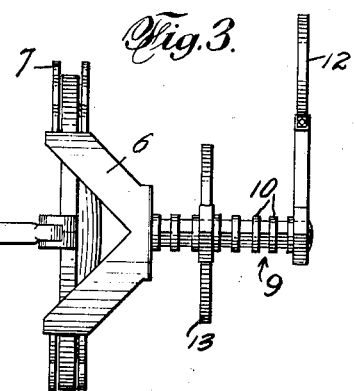
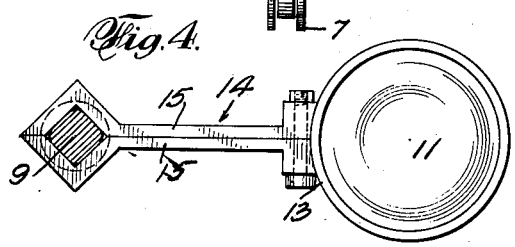
INVENTOR
EDWARD R. KOHL
BY
ATTORNEYS Patented Mar. 19, 1940

2,193,968

UNITED STATES PATENT OFFICE 2,193,968

SPECTACLE LOUPE

Edward R. Kohl, New York, N. Y.

Application June 20, 1938, Serial No. 214,627

1 Claim. (Cl. 88—41)

My invention relates to a spectacle loupe. Spectacle loupes have heretofore been made but such loupes with which I am familiar have been disadvantageous in that they required considerable adjustment to position the same as desired and each time a loupe lens is moved to an out of the way position a new adjustment is required in order to again properly position the loupe lens.

It is the principal object of my invention to provide an improved form of spectacle loupe.

It is a more specific object to provide a spectacle loupe wherein the loupe lens may be readily moved and held in a predetermined position relatively to the spectacles.

It is another object to provide a spectacle loupe wherein the loupe lens if moved to substantially the position of desired adjustment will automatically assume the desired predetermined position of adjustment.

Another object is to provide a spectacle loupe in which the loupe lens may be readily moved to an out of the way position and to a predetermined operative position.

Other objects and features of invention will be hereinafter pointed out or will become apparent to those skilled in the art.

In the drawing which shows, for illustrative purposes only, a preferred form of the invention—

Fig. 1 is a fragmentary front view of spectacles showing one form of spectacle loupe in place;

Fig. 2 is a top plan view of the parts shown in Fig. 1;

Fig. 3 is a view in left side elevation of parts shown in Fig. 1;

Fig. 4 is a sectional view taken through the supporting post for the two loupe lenses and between the same.

In said drawing, 5 indicates generally spectacles which may be of any preferred form, that is, with or without frames. My improved spectacle loupe may comprise a frame to be attached to the spectacles. In the form shown, the frame includes a base 6 having a pair of resilient or spring arms 7—7 to extend partially around the spectacle frame or lens. Each arm 7 may be formed of a U-bent piece of spring wire attached to the base 6, the two legs of the U being spaced apart and waved or fluted, as is best shown in Fig. 1, so as to embrace opposite sides of the spectacle frame and thus assist in holding the spectacle loupe in place. If desired, rollers 8—8 may be provided on the spring arms 7—7 to facilitate attachment of the loupe to the spectacles.

My improved loupe embodies means for greatly facilitating the movement of the loupe lens or lenses from the inoperative position to a predetermined desired position of adjustment. In the form shown, a post 9 is secured to the base 6 and projects forwardly at the side of the spectacles. The post is preferably of angular section, such as the square section shown. If various lens positions are desired longitudinally of the post, the latter is preferably provided with spaced ribs such as 10 and between the ribs are the angular sides of the post for engagement by the frame part of the loupe lens. In the form illustrated, I employ two loupe lenses 11—12, which may be lenses of different power and which may be used separately or in combination. Each loupe lens, for example the lens 11 shown more in detail in Fig. 4, may embody an encircling frame 13 and a lens arm 14 extends from the encircling frame 13. The arm 14 may comprise a pair of spring arms 15—15 formed at the outer end so as to provide an angular opening of a size to substantially fit and snugly grip the angular portion of the post 9. Thus, when the lens 11 is in the operative position shown in the drawing, the angular portion of the post 9 embraced between the spring arms 15—15 will substantially fit the angular opening therein and the lens 11 will be quite firmly though resiliently held in operative position on the post 9. When it is desired to move the lens to an upper or out of the way position so that the spectacles may be used without the loupe, the loupe lens may be moved upwardly and during such movement the spring arms 15—15 will give sufficiently to permit the angular movement of the loupe lens about the angular post 9. When the loupe lens has been moved somewhat less than 90 degrees from its operative position, the spring arms 15—15 serve in effect as a snap action means to snap the lens to its upper position and firmly though resiliently hold it in that position. When it is desired to move the loupe lens back into operative position, it is simply swung downwardly with the fingers and when it has almost reached its operative position, the spring arms 15—15 again serve as snap action means to snap the loupe lens into operative position substantially in the desired line of sight through the spectacles.

The loupe means 12 and its holding means are preferably of the same construction as that last described. Obviously, one or a plurality of loupe lenses may be provided and the lenses may be adjusted longitudinally of the post by simply placing the spring arms between any desired pair of ribs 10—10.

My improved loupe saves a great deal of time in adjusting, for the reason that the lens need only be moved to a position approximating the predetermined desired position of adjustment relatively to its frame and the spring arms 15—15 will automatically spring it to the predetermined desired position. In my improved spectacle loupe there are substantially no parts to loosen up due to wear, and the loupe is convenient, durable and effective in use.

While the invention has been described in considerable detail and a preferred form illustrated, it is to be understood that various changes may be made within the scope of the invention as defined in the appended claim.

I claim:

In a spectacle loupe, a loupe frame to be detachably secured to spectacles, said frame member having a pair of arms resiliently urged toward each other, each of said arms having parts to fit in front and in rear of a spectacle lens for resiliently and securely attaching the loupe frame to the spectacles, a forwardly extending post on said loupe frame, said post being of angular formation, a loupe lens having an arm thereon comprising a pair of members at least one of which is resilient, said arm having an aperture therein to substantially fit the angular portion of said post, said aperture being partially defined by each of said members, whereby said lens will be held in definite predetermined angular position on said post, and whereby said members of said arm may be resiliently spread apart by said angular post upon turning of said arm on said post and the lens swung to a different angular position and resiliently held in such different angular position.

EDWARD R. KOHL.